United States Patent
Faitelson et al.

(10) Patent No.: US 9,621,558 B2
(45) Date of Patent: Apr. 11, 2017

(54) GRANTING COLLABORATION PERMISSIONS IN A COMPUTERIZED SYSTEM

(71) Applicant: VARONIS SYSTEMS, LTD., Herzliya (IL)

(72) Inventors: Yakov Faitelson, New York, NY (US); Ohad Korkus, New York, NY (US); Ophir Kretzer-Katzir, Tenafly, NJ (US)

(73) Assignee: VARONIS SYSTEMS, LTD., Herzliya (IL)

( * ) Notice: Subject to any disclaimer, the term of this patent is extended or adjusted under 35 U.S.C. 154(b) by 92 days.

(21) Appl. No.: 14/341,812

(22) Filed: Jul. 27, 2014

(65) Prior Publication Data

US 2016/0028734 A1 Jan. 28, 2016

(51) Int. Cl.
*H04L 29/06* (2006.01)

(52) U.S. Cl.
CPC .......... *H04L 63/101* (2013.01); *H04L 63/102* (2013.01); *H04L 65/403* (2013.01)

(58) Field of Classification Search
CPC ..... H04L 63/101; H04L 65/403; G06F 21/30; G06F 21/31; G06F 21/00
USPC .......................................................... 726/28
See application file for complete search history.

(56) References Cited

U.S. PATENT DOCUMENTS

| | | | | |
|---|---|---|---|---|
| 2004/0199420 | A1* | 10/2004 | Bhakta | G06Q 30/02 705/14.4 |
| 2005/0015628 | A1* | 1/2005 | Narayanan | G06F 21/31 726/19 |
| 2007/0094265 | A1* | 4/2007 | Korkus | G06F 21/316 |
| 2009/0100058 | A1* | 4/2009 | Faitelson | G06F 17/30587 |
| 2010/0005499 | A1* | 1/2010 | Covey | H04L 12/1827 725/109 |
| 2011/0061093 | A1* | 3/2011 | Korkus | G06F 21/604 726/4 |
| 2012/0271855 | A1* | 10/2012 | Faitelson | G06F 21/41 707/785 |

* cited by examiner

*Primary Examiner* — William Goodchild
(74) *Attorney, Agent, or Firm* — Soroker Agmon Nordman

(57) ABSTRACT

A computerized method for obtaining collaboration with an object of a computerized system, comprising receiving at an owner party that owns the object a request from a requesting party employing a requesting mechanism of the computerized system to collaborate the object with a recipient party, providing by the owner party a decision to the recipient party whether to grant the recipient party to collaborate with the object, and registering, in a data construct of the computerized system, data comprising a status indicative of the decision, thereby providing for the computerized system to determine whether to allow the recipient party to collaborate with the object, wherein the method is performed on an at least one computer of the computerized system configured to perform the method, and an apparatus for performing the same.

24 Claims, 4 Drawing Sheets

Prior Art

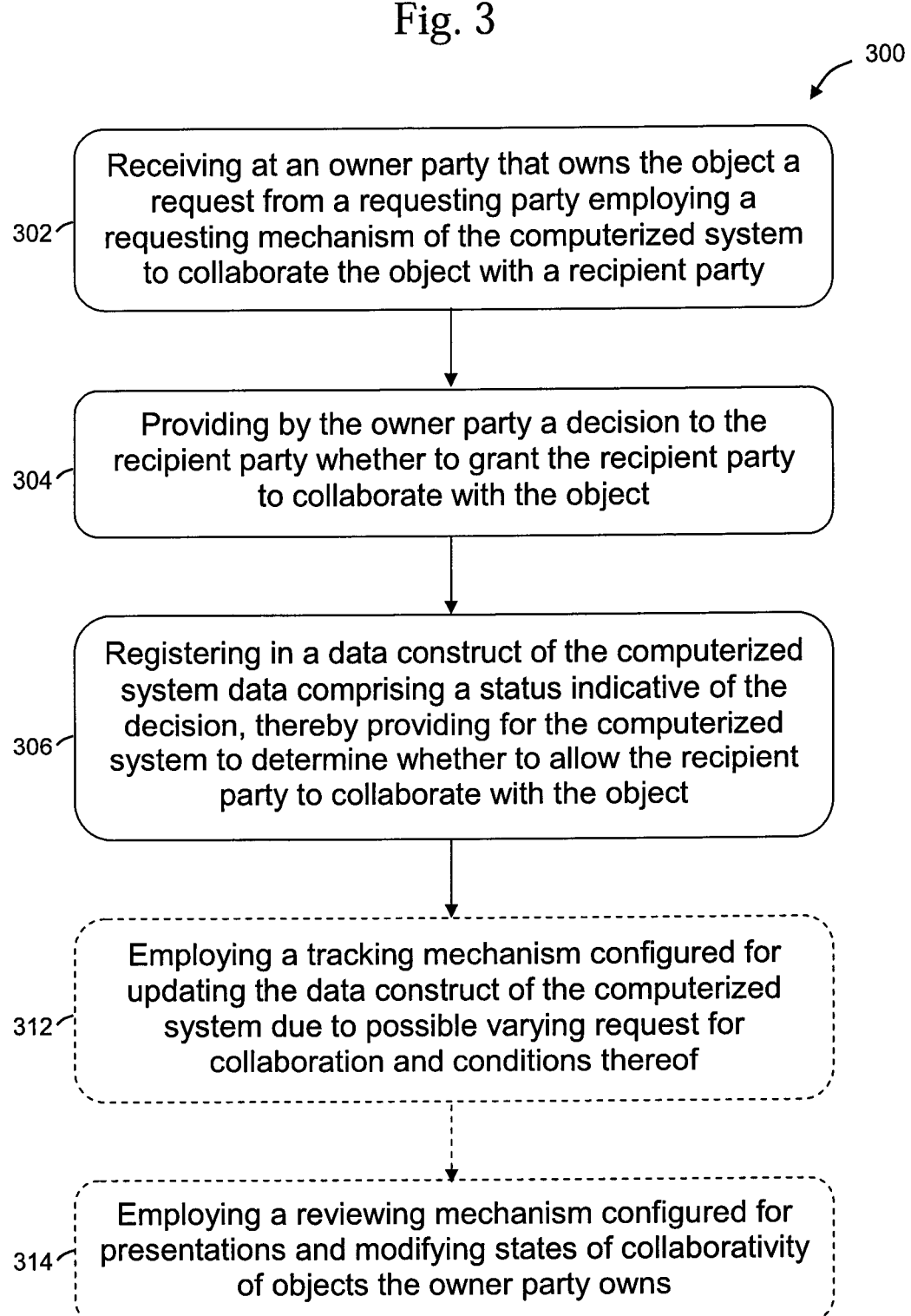

GRANTING COLLABORATION PERMISSIONS IN A COMPUTERIZED SYSTEM

BACKGROUND

The present disclosure generally relates to handling of objects in a multi-platform computerized system, and more specifically to granting permissions to collaborate with objects of the multi-platform computerized system.

Collaboration of object of computerized systems, such as files and folders, is known in the art. For example, collaboration with Windows Office files (Microsoft Inc.) or PDF files (Adobe Systems Inc.).

SUMMARY

One exemplary embodiment of the disclosed subject matter is a computerized method for obtaining collaboration with an object of a computerized system, comprising receiving at an owner party that owns the object a request from a requesting party employing a requesting mechanism of the computerized system to collaborate the object with a recipient party, providing by the owner party a decision to the recipient party whether to grant the recipient party to collaborate with the object, and registering, in a data construct of the computerized system, data comprising a status indicative of the decision, thereby providing for the computerized system to determine whether to allow the recipient party to collaborate with the object, wherein the method is performed on an at least one computer of the computerized system configured to perform the method, and an apparatus for performing the same.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
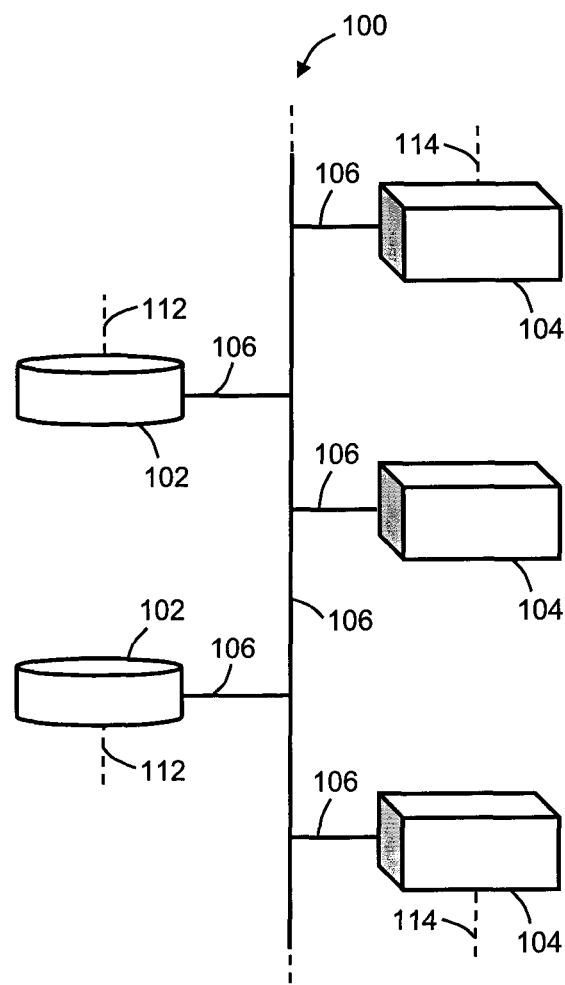

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2A:
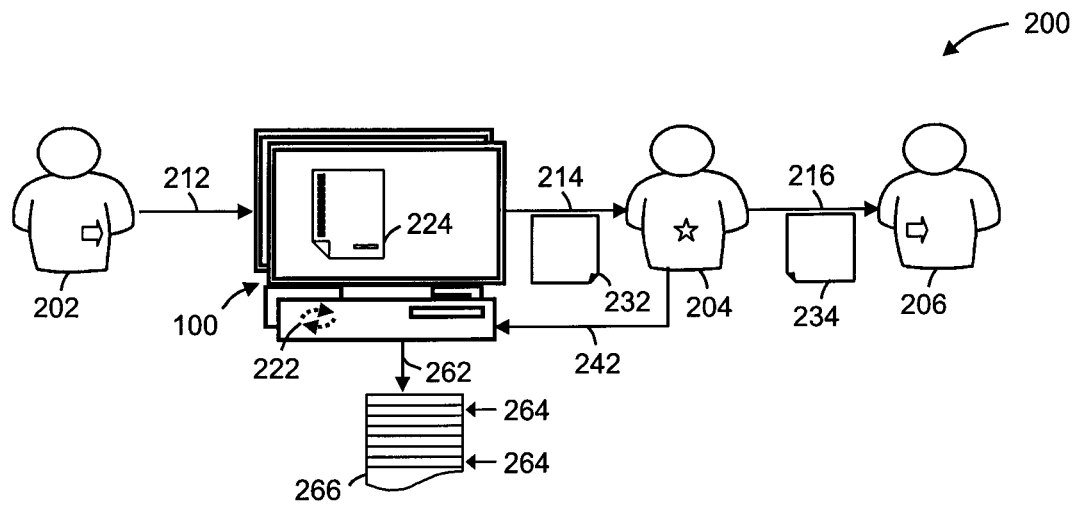
Figure 2B:
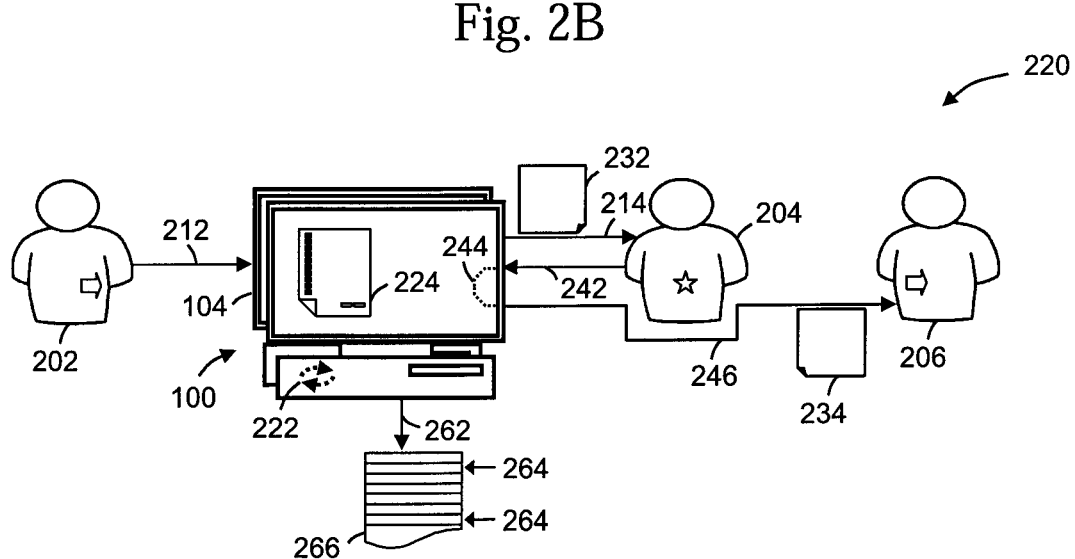
Figure 2C:
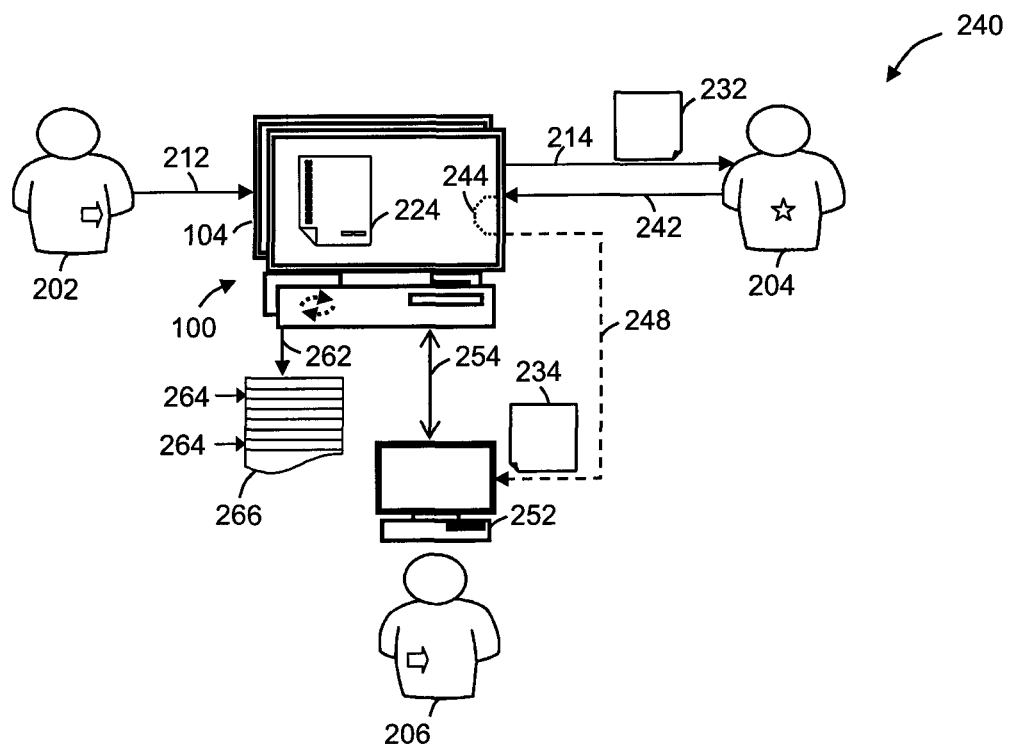
Figure 2D:
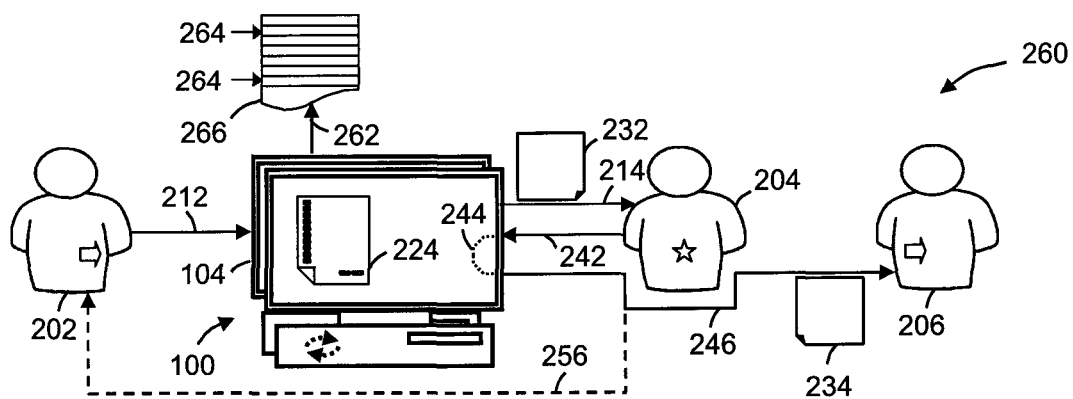

FIG. 1 schematically illustrates a computerized system such as known in the art;

FIG. 2A schematically illustrates an arrangement and a respective course of actions in requesting collaboration with an object of a computerized system, according to exemplary embodiments of the disclosed subject matter;

FIG. 2B schematically illustrates another arrangement and a respective course of actions in requesting collaboration with an object of a computerized system, according to exemplary embodiments of the disclosed subject matter;

FIG. 2C schematically illustrates yet another arrangement and a respective course of actions in requesting collaboration with an object of a computerized system, according to exemplary embodiments of the disclosed subject matter;

FIG. 2D schematically illustrates still another arrangement and a respective course of actions in requesting collaboration with an object of a computerized system, according to exemplary embodiments of the disclosed subject matter; and FIG. 3 outlines operations in obtaining collaboration with an object of a computerized system, according to exemplary embodiments of the disclosed subject matter.

DETAILED DESCRIPTION

In the context of the present disclosure, without limiting, the term 'computerized system' implies a system comprising a plurality of computing apparatuses, such as computers, communicating therebetween and having and/or sharing and/or communicating with a data storage device. The data storage device is also referred to as 'data storage' or 'storage'.

For brevity, referring to an operation of and/or by a computerized system implies an operation of and/or by one or more components and/or of the computerized system, such as by one or more computers of the computerized system.

Generally, without limiting, a computerized system comprises several computers in a range between about 10 computers to about 1000 computers or more. Optionally, a computerized system comprises less than 10 computers, not precluding having one computer as, for example, a mainframe computer.

Generally, in the context of the present disclosure the computerized system belongs and/or is a part of an organization, such as a business, department of a government or institution or an association.

In the context of the present disclosure, without limiting, the term 'object' implies a data element of computerized system, such as folder, a file or a database.

In the context of the present disclosure, without limiting, the term 'party' implies a user of a computerized system and/or a person operating an apparatus connectable to the computerized system.

In the context of the present disclosure, without limiting, the term 'authorized party' with respect to an object implies a party having sufficient authority to allow and/or deny collaboration with the object. For example, an owner of the object in the computerized system, a business-owner with respect to the object, an administrator or an IT personnel of the computerized system.

For brevity and without limiting, an authorized party of an object is referred to as the owner of the object or as an owner.

In the context of the present disclosure, the term 'requester' implies a party requesting or asking an authorized party of an object for collaboration with an object. Generally, without limiting, a requester has some standing or rank in the computerized system and/or affiliation with the organization, such as relations with the authorized party that allows requesting for collaboration, for example, belonging to the same users group as the authorized party. Optionally and/or additionally, in some cases or embodiments, the requester does not belong to the organization and/or does not otherwise affiliated with the organization, for example, an ad-hoc participant in the computerized system or a party operating a computer externally linkable to the computerized system.

In the context of the present disclosure, without limiting, the term 'recipient' implies a party for which collaboration with an object is requested. In some cases or embodiments the recipient does not have sufficient standing in the computerized system and/or affiliation with the organization, for example, an ad-hoc participant in the computerized system or a party operating a computer externally linkable to the computerized system. Optionally and/or additionally, in some cases or embodiments, the recipient does belong to the organization and/or is otherwise affiliated with the organization.

In some embodiments, a requester is also a recipient.

In the context of the present disclosure, without limiting, the terms 'permissions' or 'rights' with respect to collaboration of an object imply attributes of the computerized system and/or the object according to which collaboration with the object is allowed or denied, possibly depending on certain conditions.

In the context of some embodiments of the present disclosure, without limiting, the term collaboratable implies a property or a quality of an entity, such as an object, indicating ability or capacity to participate in collaboration or a collaborated operation with a plurality of parties.

In the context of the present disclosure, without limiting, referring to a party, such as an owner, a recipient or a requester, implies also a person and/or any entity, such as a program, operating on behalf of the party. For example, a party to which an owner of an object delegated responsibility for handling collaboration of the object, or a program configured for handling collaboration for the owner of objects.

In the context of the present disclosure, without limiting, referring to an external party or a remote party implies a party operating a computer externally linkable to the computerized system, where the external party or the remote party belongs to the computerized system and/or affiliated with the organization and/or does not belong to the computerized system and/or not affiliated with the organization.

The terms cited above denote also inflections and conjugates thereof.

One technical problem dealt by the disclosed subject matter is obtaining collaboration permissions for objects of a computerized system in a controlled systematic manner.

One technical solution according to the disclosed subject matter is a mechanism, referred to also as a requesting mechanism, operative in the computerized system, and by which requests and consents for collaboration rights for an object are provided.

The requesting mechanism provides a construct, such as a computerized form, where a requester indicates the object intended for collaboration with, and references to the requester and a recipient and optionally also respective contact or access information. Consequently, based on records of the computerized system, the requesting mechanism identifies and contacts the owner of the object or any party operating on behalf of the owner, thereby indicating to the owner that collaboration permission is requested by the requester for the recipient. Responsively, the owner may deny the recipient to collaborate with the object, or the owner may grant the recipient collaboration permission with the object, possibly upon some restrictions or conditions such as expiration date of the grant. In some embodiments, the recipient and optionally also the requester are notified about the collaboration state as granted or denied, and responsive to granting collaboration the owner provides the recipient with a link and/or any other information for accessing the object, optionally along with the notification.

Subsequently, according to the owner's response of granting or denying collaboration with the object, a collaboration status of the object reflecting the state of the object with respect to collaboration is registered in a data construct of the computerized system together with the possible restrictions and identification of the recipient. Optionally, some other information is also recorded such as identification of the requester and/or the owner and/or some other date or attributes of the object such as identifications of other parties collaborating or allowed to collaborate with the object or the date and time when the collaboration was requested and/or granted. The data construct, referred to as a collaboration catalog, may be a list of records, a database or any suitable construct configured for storing multiple items with respect to an object. Optionally or alternatively, the requesting mechanism sets an attribute of the object according to the collaboration status, such as a link to a corresponding record or entry of the collaboration catalog.

In some embodiments, when collaboration with the object is attempted by the recipient, the computerized system checks the collaboration status and possible restrictions and allows or denies collaborativity accordingly. Thus, granting and denial and respective status of collaborativity of objects with parties of the computerized system are handled in the computerized system in a controlled and systematic manner.

Another technical problem dealt by the disclosed subject matter is automatically tracking and maintaining collaboration permissions for objects of a computerized system in a controlled systematic manner.

During the operation of the computerized system collaboration with objects may be requested, and owners of objects requested for collaboration may modify the collaborativity of at least some of the objects with respect to at least some of the recipients, thereby modifying the corresponding collaboration status.

Thus, another technical solution according to the disclosed subject matter is a repeating process of the computerized system, referred to also as a collaboration tracker, that repeatedly checks the collaboration status and possible constraints, and determines whether the collaborativities of objects are valid. In case the collaborativities of the objects are not valid, the collaboration tracker blocks the collaborations of the objects such as by modifying the collaboration status to indicate that collaboration is denied, at least for one or more particular recipients.

Yet another technical problem dealt by the disclosed subject matter is allowing an owner of objects to review and/or modify collaborativity status of objects, such as collaboration permissions, in a computerized system in a controlled systematic manner.

Yet another technical solution according to the disclosed subject matter is a process of the computerized system, referred to also as an entitlement review, that operates periodically and/or upon a request or responsive to an event pertaining to collaboratable object. The entitlement reviewer presents to an owner of objects for which collaborativity was requested information pertaining to the objects.

In some embodiments, the presentation comprises a data construct, such as a form, that lists the collaborations state of objects owned by the owner. For example, the data construct comprises records, where each record indicates an object, the respective recipient or recipients, the collaboration status and collaboration constraints, and possibly other data such as an indication whether the object is being collaborated with and by whom and/or the corresponding requester. Optionally, the data construct comprises fields and/or controls allowing the owner to modify the collaboration rights and/or collaboration constraints and accordingly the collaboration status. In some embodiments, the data construct provides auxiliary information such as the actual usage made by each party with the collaborated objects, indication of the sensitivity of the objects, permissions of the collaborated objects and/or permissions of the parties, metadata of the collaborated objects, or any combination of the above.

In some embodiments, the period of repetition of the entitlement reviewer is pre-set by the computerized system. Optionally, the period of the entitlement reviewer may be set for each owner by the owner and/or the computerized system. In some embodiments, a mechanism of the computerized system is provided that enables an owner to invoke the entitlement reviewer irrespective of the periodic schedule. Optionally, an owner or a party or a program operating on his or her behalf may suspend and re-enable the entitlement reviewer.

It is noted that the techniques described above may employ existing mechanisms and/or infrastructures. For example, data constructs such as forms may employ Web sites interacting with a component of the computerized system as a server, or, for example, the owner may notify a requester by email or SMS.

A potential technical effect of the disclosed subject matter is a computerized system having facilities to grant and manage collaboration rights of objects in a controlled systematic manner.

It is emphasized that, at least in some embodiments, collaboration permission may be applicable to objects provided that the objects are designated as collaborable.

It is further emphasized that granting and denying collaboration for an object is indicated in the collaboration status of the objects and possibly in metadata thereof, without any effect or any consequence on the objects per se and on the computerized system and/or managements thereof in terms of permissions, classifications and so forth. For example, a file-system of one or more computers of the computerized system is not affected whatsoever by granting or denying collaborations of objects of the one or more computers. Only when actual collaboration with an object is applied for, the computerized system and/or management thereof, such as operating system, facilitates the collaboration.

FIG. 1 schematically illustrates a computerized system 100 comprising a plurality of computers, illustrated as three instances of a computer 104, representing any number of computer 104, as indicated by dashed lines 114.

Computerized system 100 further comprises one or more data storage devices, illustrated as two instances of a data storage device 102, representing any number of data storage device 102, as indicated by dashed lines 112. Data storage device 102 generally stores objects or data entities such as folders, files or database records or similar elements, collectively referred to also as objects.

The instances of computer 104 are connected or linked or coupled therebetween and also to the instances of data storage device 102, the connection or linkage illustrated and represented by a network 106.

FIG. 2A schematically illustrates an arrangement 200 and a respective course of actions in requesting collaboration with an object of computerized system 100, according to exemplary embodiments of the disclosed subject matter. For clarity and simplicity, the object is not indicated.

Generally, a request for collaboration of the objects is initiated by a requester, denoted as a requester 202, which applies to a party owning the object or owner, denoted as an owner 204, there by requesting to grant or allow another party, denoted as a recipient 206, to collaborate with the object.

Optionally, requester 202 supplies or indicates a motivation or a rationale for the request. Owner 204 may consent to the request, possibility with some provisions or constraints for the collaboration, or may altogether refuse to or deny the request, optionally indicating reasoning or justification for the decision.

As indicated by an arrow 212, requester 202 operating on computerized system 100 such as on computer 104, employs a mechanism for requesting collaboration with the object as a requesting mechanism, denoted also as requesting mechanism 222, which provides requester 202 with an accessible editable data construct illustrated as a request form 224.

Requester 202 fills in and/or edits request form 224, thereby providing indications or references of the object, the recipient and possibly other information such as of requester 202. Consequently, as indicated by an arrow 214 and request data 232, computerized system 100, such as by way of requesting mechanism 222, notifies or sends to owner 204 with information pertaining to the request as construed from the data in request form 224.

Responsively, as indicated by an arrow 216, owner 204 upon his or her discretion notifies or sends to recipient 206 a grant for collaboration with the object with optional information regarding the object and collaborativity with the object, as illustrated schematically by recipient data 234. Recipient data 234 may comprise access information to the object such a link thereto and possibly constraints on the collaborativity such as range of dates and times and/or expiration date and time. Alternatively, owner 204 may not grant or deny collaborativity of the object with recipient 206, as also indicated and illustrated by arrow 216 and recipient data 234, the latter optionally comprising denial indication and possibly reasons for the denial.

As schematically illustrated by an arrow 242, collaboration state as granted or denied by owner 204 with respect to the object and recipient 206 are provided by owner 204 to computerized system 100 together with possible constraints and optionally other information such as reasoning for denial of collaboration.

Consequently, as schematically illustrated by an arrow 262, computerized system 100 records or registers the collaboration state along with the respective possible constraints in a unit or a record, denoted as record 264, of a data construct of computerized system 100, collectively referred to as collaboration catalog and denoted as a collaboration catalog 266.

Though collaboration catalog 266 is stored and maintained in computerized system 100, for clarity, collaboration catalog 266 is illustrated outside of computerized system 100.

Thus, by referring to collaboration catalog 266, computerized system 100 allows or blocks collaboration with an object upon a recipient applying or calling for collaboration with the object.

Without limiting, requester 202, owner 204 and recipient 206 are parties of computerized system 100. The communication between owner 204 and recipient 206 may be carried out in computerized system 100 such as be way of network 106. Optionally or alternatively, the communication between owner 204 and recipient 206 may be carried out by other techniques such as by email, SMS or via a server such as a server such as a Web server. Further in some embodiments, requesting mechanism 222 and accessible editable data construct such as request form 224 are provided and handled by a Web server that, at least optionally, is remote to computerized system 100.

FIG. 2B schematically illustrates, as a variation of arrangement 200 and respective course of actions, an arrangement 220 and a respective course of actions in requesting collaboration with an object of computerized system 100, according to exemplary embodiments of the disclosed subject matter. For clarity and simplicity, the object is not indicated.

Responsive to receiving a request for collaborativity, as indicated by arrow 214 and request data 232, owner 204 responds to computerized system 100 such as to requesting mechanism 222 as indicated by an arrow 242. As indicated by a dotted line 244, computerized system 100 constructs and sends recipient data 234 as indicated by an arrow 246 to recipient 206 on behalf of owner 204.

Thus, unlike arrangement 200 and respective course of actions where owner 204 contacts recipient 206 directly, in arrangement 220 and a respective course of actions thereof owner 204 contacts recipient 206 indirectly via computerized system 100.

FIG. 2C schematically illustrates, as a variation of arrangement 220 and the respective course of actions, an arrangement 240 and a respective course of actions in requesting collaboration with an object of computerized system 100, according to exemplary embodiments of the disclosed subject matter. For clarity and simplicity, the object is not indicated.

A noteworthy difference or variation from arrangement 240 and the respective course of actions is that recipient 206 operates a computer linked to computerized system 100 outside thereof, as indicated by a double-arrow 254, the computer denoted as a remote computer 252.

Thus, computerized system 100 constructs and sends recipient data 234 to recipient 206 at remote computer 252 on behalf of owner 204, as illustrated schematically by an arrow 248.

FIG. 2D schematically illustrates, as a variation of arrangement 220 and the respective course of actions, an arrangement 260 and a respective course of actions in and a respective course of actions in requesting collaboration with an object of computerized system 100, according to exemplary embodiments of the disclosed subject matter. For clarity and simplicity, the object is not indicated.

A noteworthy difference or variation from arrangement 220 and the respective course of actions is that requester 202 requests owner 204 to for collaboration of the object with recipient 206. Accordingly, requester 202 may provide indication to that effect in request form 224. Consequently, requester 202 receives a notification and/or data such as recipient data 234 or some appropriate variant thereof, as indicated by a dashed-arrow 256, even if, otherwise, requester 202 would not necessarily receives any feedback from the collaboration request.

Arrangement 200, arrangement 220 and arrangement 240 and the respective courses of actions are provided as non-limiting exemplary embodiments, and variations and/or combinations thereof may be deduced in accordance of the present disclosure.

For example, requester 202 may operate a remote computer akin to remote computer 252, possibly along with recipient 206 that operates remote computer 252; or, for example, requester 202 and recipient 206 is the same party, namely, requester 202 requests owner 204 for collaboration with the object.

It is noted that the variations or combinations may be reflected accordingly in request form 224 and/or request data 232 and/or recipient data 234.

A non-limiting illustrative example of request form 224 is presented in Table-1 below.

TABLE 1

| | |
|---|---|
| Requester | John Smith [V] |
| Recipient | Pamela Doe [V] |
| Object | \\ServererSales\2014\quarter2\tablets.xls |
| Recipient contact | pamela.doe@ourmarketing.com |
| Requester contact | john.smith@oursales.com |
| Rationale | "to synchronize marketing and sales" |

The '[V]' symbol represents s pull-down control where the respective parties registered in computerized system 100 are presented and selected. Based on the selected parties the respective contact information is automatically retrieved from records of computerized system 100. The designation of the object is manually entered or selected by browsing trees of computerized system 100. The rationale is either manually entered and/or selected from a pre-set list of computerized system 100 such as of requesting mechanism 222.

The rationale for the request as in the example above and/or in some of the examples below is optional, and is intended to assist the owner in making the collaboration decision. In some cases, the rationale is not required, for example, in case the requester is of higher standing in the organization than the owner, or the requester owner are peers or work alliances.

Another non-limiting illustrative example of request form 224 is presented in Table-2 below.

TABLE 2

| | |
|---|---|
| Requester [in our organization] (●) (○) | John Smith [V] |
| Recipient [in our organization] | "Jack Robinson" |
| Object | \\serverSales\2014\quarter2\tablets.xls |
| Recipient contact | "jack.robinson@tablet-ssupplier.com" |
| Requester contact | john.smith@oursales.com |
| Requester participant | Yes: (○) No: (●) |
| Rationale | "to synchronize marketing and sales" [V] |

The pairs of symbols as (●) (○) represent radio-buttons controls. Thus, as shown, the requester is a party of the organization and thus may be selected from data of computerized system, and accordingly the respective contact is retrieved. On the other hand, the recipient is not a party of the organization and, therefore, should be designated manually as well as the contact thereof.

In case the requester wishes to collaborate with the recipient, the requester may indicate that such by selecting the appropriate radio-button.

It is noted that the instances of request form 224 above are provided as examples, and other variations and/or combinations thereof may be used.

A non-limiting illustrative example of request data 232 is presented in Table-3 below.

TABLE 3

| | |
|---|---|
| Requester | 'John Smith' |
| Recipient | 'Pamela Doe' |
| Object | \\serverSales\2014\quarter2\tablets.xls |
| Recipient contact | pamela.doe@ourmarketing.com |
| Requester contact | john.smith@oursales.com |
| Rationale | "to synchronize marketing and sales" |

Another non-limiting illustrative example of request data 232 is presented in Table-4 below.

TABLE 4

| Requester | 'John Smith' |
|---|---|
| Recipient | 'Jack Robinson' |
| Object | \\serverSales\2014\quarter2\tablets.xls |
| Recipient contact | jack.robinson@tablet-ssupplier.com |
| Requester contact | john.smith@oursales.com |
| Rationale | "intended recipient is a business associate" |

The contents of the exemplary request data 232 above are apparently self-evident, and for brevity are not further elaborated. It is noted that, at least in some embodiments, the contents of request data 232 resembles or matches request form 224.

It is noted that the instances of request data 232 above are provided as examples, and other variations and/or combinations thereof may be used.

A non-limiting illustrative example of recipient data 234 is presented in Table-5 below.

TABLE 5

| Object | \\ours\serverSales\2014\quarter2\tablets.xls |
|---|---|
| Collaboration | Granted |
| Constraints | July 2014 |

The collaboration is set as granted, such as by a textual string or some code.

The constraints limit the collaboration of the recipient with the object only during July 2014.

As the recipient may operate a remote computer, such as a remote computer 252, the link for the object may be elaborated or expanded so that the recipient could access it outside of the organization of computerized system 100. Thus, in Table-5 the link comprises an exemplary root server 'ours' that is accessible outside of the organization, possibly subject to security measures such as permissions, passwords or other techniques as known in the art.

Another non-limiting illustrative example of recipient data 234 is presented in Table-6 below.

TABLE 6

| Object | \\ours\serverSales\2014\quarter2\tablets.xls |
|---|---|
| Collaboration | Denied |
| Rationale | "the requested object is confidential" |

The collaboration is set as denied, such as by a textual string or some code.

The rational, an optional entry, explains why the collaboration was denied.

It is noted that recipient data 234 or a variation thereof may also be sent to the requester so that the latter is informed of the outcome of the request.

It is noted that the instances of recipient data 234 above are provided as examples, and other variations and/or combinations thereof may be used.

In some embodiments, an administrative aspect of the decision of owner 204 to grant or deny a request for collaboration of an object by recipient 206 is registering the decision in collaboration catalog 266 of computerized system 100 such as of requesting mechanism 222.

Collaboration catalog 266 and comprises an indication of the decision such as by a code or a text. Further collaboration catalog 266 comprises the constraints set on granted collaborations.

A non-limiting illustrative example of an entry of a unit or a record of collaboration catalog 266 is presented in Table-7 below.

TABLE 7

| Object | \\serverSales\2014\quarter2\tablets.xls |
|---|---|
| Collaboration | Granted |
| Recipient | 'Pamela Doe' |
| Constraints | July 2014 |

Another non-limiting illustrative example of an entry of a unit or a record of collaboration catalog 266 is presented in Table-8 below.

TABLE 8

| Object | \\serverSales\2014\quarter2\tablets.xls |
|---|---|
| Collaboration | Denied |
| Recipient | 'Pamela Doe' |
| Constraints | —/— |

In some embodiments, a plurality of recipients may be requested for collaboration with an object which possibly may be granted. Likewise, collaborations of a plurality of objects may be requested for a recipient.

Such cases may be reflected in some variations of the collaboration catalog. For example, a separate unit or entry is dedicated for each request for collaboration. Optionally or alternatively, each entry or unit is configured to comprise a plurality of objects and/or recipients, such as by a linked list. Optionally or alternatively, the collaboration catalog may be constructed and/or arranged in other manners, such as a database with records for each request for collaboration.

In some embodiments, collaboration rights are automatically granted, thus bypassing the owner. By way of example, assuming that the owner is an authorized party with respect to objects classified as belonging to human resources department, so that a request for collaboration permission by a requester of the human resources department is automatically granted collaboration the objects.

In some embodiments, requests for collaborations with objects are automatically granted based on constructs of the computerized system, such as according to rules set by an authorized party for the objects and/or owners of the objects. The rules are constructed with conditions pertaining to objects and/or parties as recipients, where, optionally, the conditions relate to properties or characteristics of the parties and/or objects, such as classifications or access permissions.

Thus, when a requester requests collaboration with an object, the rules are checked and in case the requester and the object meet the conditions of at least one of the rules then the requester is granted rights to collaborate with the object. Optionally, the rules comprise constraints for collaboration such as date and time period or expiration time period.

In some embodiments, automatically granted collaborations follow or conforms to other characteristics of requesting collaboration as described above, such as registering the collaboration status in the collaboration catalog.

For consistency, the requester is thus considered, without limiting, as a recipient.

It is noted that referring to rules and/or objects may imply one rule and/or object, respectively.

A non-limiting illustrative example of a rule is presented in Table-9 below.

TABLE 9

| | |
|---|---|
| Object classification | Accessories_sales |
| Requester permissions | Sales |
| Constraints | Week in 13\|26\|39\|52 |

Thus, in case the requester has access permissions to objects of the Sales department and the requested object is classified as Accessories_sales then the requester is allowed to collaborate with the object on the last week of every quarter.

The constraints above are shown in a figurative manner, and any formula or algorithm may be stated such as by way of a logical expression as known in the art.

Generally and without limiting, the computerized system such as computerized system 100 is dynamic in the sense that objects are created, deleted and modified along with properties and attributes thereof, including a setting and alterations of collaborativity rights. Likewise, generally, parties are added, removed and modified along with properties and attributes thereof. Also likewise, collaborations with objects may be requested and/or modified. Obviously, time progress during the operation of the computerized system possibly alters the effects of date and time constraints for collaborativity of objects. Consequently, collaborations statuses such as maintained in the collaboration catalog may not be up-to-date.

Therefore, in some embodiments, in order to keep the collaboration catalog in proper state that reflects the actual states of collaborativity states, at least within some time interval, an updating mechanism is devised in the computerized system, referred to also as a collaboration tracker.

In some embodiments, the collaboration tracker is a repeated process that repeatedly checks the collaboration statuses and possible constraints with respect to objects and/or recipients.

In case collaborativities of objects so far are set as valid ones and the collaboration tracker determines otherwise, then the collaboration tracker alters the respective collaboration status in the collaboration catalog thereby denying collaborativity with the objects. For example, in case a time constraint has passed, or classification of the recipient has changed adversely for collaboration, or the recipient is not applicable such as a recipient in a remote computer is no longed linked to the computerized system or has logged-off.

Alternatively, in case collaborativities of objects so far are set as not valid and the collaboration tracker determines otherwise, then the collaboration tracker alters the respective collaboration status in the collaboration catalog thereby allowing collaborativity with the objects. For example, in case a time constraint became to be applicable, or classification of the recipient has changed to meet collaborativity.

In some embodiments, the collaboration tracker operates periodically such as according to a preset or determined period. Optionally or alternatively, the collaboration tracker is invoked responsive to events such as due to alterations of objects and/or recipients and/or properties thereof.

Thus, the collaboration tracker keeps track of the collaborations and maintains the collaboration states up-to-date.

Generally, in the course of the operation of the computerized system, such as computerized system 100, numerous requests for collaborations with objects might have been done, and thus owners of objects might not be able to keep track of the state of collaborations decided by the owners.

Thus, an owner that has been requested for collaboration of objects might want to review the states of collaborations he or she has decided upon.

For that end, in some embodiments, a reviewing mechanism is devised in the computerized system, referred to also as an entitlement reviewer.

The entitlement reviewer presents to owners that were requested for collaboration of objects a list and/or another layout with contents similar to that of the collaboration catalog with respect to objects. Subsequently, in some embodiments, the presentations are configured to allow the owners to modify the collaboration statuses, thereby enabling denied collaborations and denying allowed collaborations.

In some embodiments, the entitlement reviewer is operative periodically, with time intervals set by the computerized system and/or by owners. Optionally or additionally, an owner may invoke the entitlement reviewer respective to objects he or she owns.

FIG. 3 outlines operations 300 in obtaining collaboration with an object of a computerized system, according to exemplary embodiments of the disclosed subject matter.

In operation 302 a request from a requester employing a requesting mechanism of the computerized system to collaborate an object with a recipient is received at an owner that owns the object.

The computerized system is computerized system 100 or a variation thereof, and requester, the owner and the recipient are as or akin to requester 202, owner 204 and recipient 206, respectively.

In some embodiments, the request comprises reasoning or justification for granting the request.

In some embodiments, the recipient is a party operating a computer remotely linked to the computerized system, such as remote computer 252.

In some embodiments, the requestor and the recipient are the same party.

In operation 304 a decision whether to grant the recipient to collaborate with the object is provided by the owner to the recipient subsequently to the request. Optionally the owner provides the recipient with information for accessing the object.

In some embodiments, the decision with optional data thereof is sent to the recipient. Optionally or alternatively, the decision with optional data thereof is provided to the recipient by way of the computerized system.

In case the request is approved, the approval may be accompanied with limitation or constraints, such as time and/or date limitations.

In case the request is denied the decision provided to the recipient may be accompanied by reasoning why the request is refused.

In operation 306 data comprising a status indicative of the decision is registered in a data construct of the computerized system, such as collaboration catalog 266, according to which the computerized system can determine whether to allow the recipient to collaborate with the object, such as when the recipient applies for collaborativity with the object.

In some embodiments, the registration comprises also the limitation or constraints of granted collaborations.

It is noted that collaboration may be applicable to objects provided that the objects are designated as collaborable and/or based on other provisions such as access permission or sharing permissions with the objects or suitable classification.

In operation 312 a tracking mechanism configured for updating the data construct of the computerized system, such as collaboration catalog 266, is employed in the computerized system.

The updating may be necessary since collaborations requests and parties may be altered during the operation of the computerized system, as well time constraints or limitations that may be applicable or not pertinent as time goes on.

In operation 314, optionally, a reviewing mechanism configured for presentations and optionally modifications of the states of collaborativity of objects the owner party owns is employed in the computerized system.

Generally, without limiting, a state of collaborativity of an object comprises a status such as collaboration status in the collaboration catalog, reference to the object, constrains for collaborativity and indication of the recipient.

It is noted that operation 314 may precede operation 312, and/or operation 312 and operation 314 may be operable concurrently at least to some extent.

In some embodiments, operations and/or activities taking part in requesting, granting and/or maintenance of collaboration rights are comprised and/or take part in an audit trail of activities and/or data of the computerized system. For example, the tracking of the collaboration rights of objects with respect to parties of the computerized system.

It is noted that the by granting or denying collaboration just an indication is set accordingly, such as the collaboration status, without changing any permissions or other settings of the computerized system. The indication is used only to denote whether collaboration with an object is approved or disapproved.

Thus, by granting collaboration to an object a party, including a remote party, is allowed to collaborate with the object, provided the party has access permission to the object.

In some embodiments, pursuant to allowing a remote party to collaborate with an object of the computerized system, the physical access to the object is achieved by leveraging the credentials of the owner or a party on behalf thereof and/or to which credential have been provided.

There is thus provided according to the present disclosure a computerized method for obtaining collaboration with an object of a computerized system, comprising receiving at an owner party that owns the object a request from a requesting party employing a requesting mechanism of the computerized system to collaborate the object with a recipient party, providing by the owner party a decision to the recipient party whether to grant the recipient party to collaborate with the object, and registering, in a data construct of the computerized system, data comprising a status indicative of the decision, thereby providing for the computerized system to determine whether to allow the recipient party to collaborate with the object, wherein the method is performed on an at least one computer of the computerized system configured to perform the method.

In some embodiments, the method comprises registering in the data construct of the computerized system constraints on collaborativity in case the decision was to grant the recipient party to collaborate with the object, as provided to the computerized system by the owner party.

In some embodiments, the method comprises providing to the recipient party constraints on collaborativity in case the decision was to grant the recipient party to collaborate with the object.

In some embodiments, the method comprises, in case the decision was to deny the recipient party to collaborate with the object, providing to the recipient party reasoning for denying collaborativity.

In some embodiments, providing by the owner party the decision to the recipient party is carried out by way of the computerized system.

In some embodiments, the requesting party is also the recipient party.

In some embodiments, the recipient party operating a computer remotely linked to the computerized system.

In some embodiments, the request from a requesting party comprises reasoning for collaborating with the recipient party.

In some embodiments, the requesting party is affiliated with the organization.

In some embodiments, the requesting party is not affiliated with the organization.

In some embodiments, the recipient party is affiliated with the organization.

In some embodiments, the recipient party is not affiliated with the organization.

In some embodiments, registering in a data construct of the computerized system comprises registering an indication denoting whether collaboration with an object is approved or disapproved, devoid of affecting any settings of the computerized system.

In some embodiments, devoid of affecting any settings of the computerized system includes devoid of affecting any permissions of the computerized system.

In some embodiments, the method comprises employing in the computerized system a tracking mechanism configured for updating the data construct of the computerized system due to possible varying requests for collaboration and conditions thereof.

In some embodiments, the method comprises employing in the computerized system a reviewing mechanism configured for presentation of states of collaborativity of objects the owner party owns.

In some embodiments, the reviewing mechanism is configured for modifying the states of collaborativity of objects the owner party owns.

There is thus further provided according to the present disclosure an apparatus configured to carry out the method.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for obtaining collaboration of an object of a computerized system of an organization, comprising:
    receiving at an owner party that owns the object a request from a requesting party employing a requesting mechanism of the computerized system to collaborate the object with a recipient party, wherein the recipient party is a remote party operating a computer remotely linked to the computerized system, and wherein the requesting mechanism is operative in the computerized system;
    providing a computerized form with modifiable entries that characterize the object and participants according to which collaboration with the object is requested;
    providing by the owner party a decision to the recipient party whether to grant the recipient party permission to collaborate with the object; and
    registering, in a data construct of the computerized system, data comprising a status indicative of the decision, thereby providing for the computerized system to determine whether to allow the recipient party to collaborate with the object,
    wherein the method is performed on an at least one computer of the computerized system configured to perform the method.

2. The method according to claim 1, further comprising registering in the data construct of the computerized system constraints on collaborativity in case the decision was to grant the recipient party to collaborate with the object, as provided to the computerized system by the owner party.

3. The method according to claim 1, further comprising providing to the recipient party constraints on collaborativity in case the decision was to grant the recipient party to collaborate with the object.

4. The method according to claim 1, further comprising, in case the decision was to deny the recipient party to collaborate with the object, providing to the recipient party reasoning for denying collaborativity.

5. The method according to claim 1, wherein providing by the owner party the decision to the recipient party is carried out by way of the computerized system.

6. The method according to claim 1, wherein the requesting party is also the recipient party.

7. The method according to claim 1, wherein the request from the requesting party comprises reasoning for collaborating with the recipient party.

8. The method according to claim 1, wherein the requesting party is affiliated with the organization.

9. The method according to claim 1, wherein the requesting party is not affiliated with the organization.

10. The method according to claim 1, wherein the recipient party is affiliated with the organization.

11. The method according to claim 1, wherein the recipient party is not affiliated with the organization.

12. The method according to claim 1, wherein registering in a data construct of the computerized system comprises registering an indication denoting whether collaboration with an object is approved or disapproved, devoid of affecting any settings of the computerized system.

13. The method according to claim 12, wherein devoid of affecting any settings of the computerized system includes devoid of affecting any permissions of the computerized system.

14. The method according to claim 1, further comprising employing in the computerized system a tracking mechanism configured for updating the data construct of the computerized system due to possible varying requests for collaboration and conditions thereof.

15. The method according to claim 1, further comprising employing in the computerized system a reviewing mechanism configured for presentation of states of collaborativity of objects the owner party owns.

16. The method according to claim 15, wherein the reviewing mechanism is configured for modifying the states of collaborativity of objects the owner party owns.

17. The method according to claim 1, wherein the requested collaboration is automatically granted according to an at least one rule constructed in the computerized system.

18. The method according to claim 1, wherein the computerized form comprises fields and/or controls allowing the owner party to modify collaboration rights or collaboration constraints of the object.

19. The method according to claim 1, wherein the recipient party is a party not affiliated with the organization, an ad-hoc participant in the computerized system or a party operating a computer externally linkable to the computerized system.

20. A computerized system comprising at least one computer and configured by a mechanism provided in the computerized system to:

request an owner of an object of the computerized system to collaborate the object with a recipient party, wherein the recipient party is a remote party operating a computer remotely linked to the computerized system, and wherein the requesting mechanism is operative in the computerized system, provide a computerized form with modifiable entries that characterize the object and participants according to which collaboration with the object is requested; and further, responsive to a decision of the owner of the object whether to grant the recipient party permission to collaborate with the object, registering in the computerized system data comprising a status indicative of the decision, thus providing for the computerized system to determine whether to allow the recipient party to collaborate with the object.

21. The method according to claim 17, wherein the at least one rule is constructed with conditions pertaining to objects intended for collaboration.

22. The method according to claim 17, wherein the at least one rule is constructed with conditions pertaining to parties intended for collaboration.

23. The method according to claim 17, wherein the at least one rule is constructed with conditions pertaining to objects and parties intended for collaboration.

24. The method according to claim 17, wherein the data comprising a status indicative of the decision comprises an identification of the recipient.

* * * * *